United States Patent [19]

Tibbals, Jr.

[11] Patent Number: 4,700,581

[45] Date of Patent: Oct. 20, 1987

[54] SINGLE BALL TRACTION DRIVE ASSEMBLY

[75] Inventor: Edward C. Tibbals, Jr., High Point, N.C.

[73] Assignee: William R. Loeffler, Englewood, Colo.

[21] Appl. No.: 799,547

[22] Filed: Nov. 18, 1985

Related U.S. Application Data

[63] Continuation of Ser. No. 346,289, Feb. 5, 1982, abandoned.

[51] Int. Cl.$^4$ ............................................. F16H 15/26
[52] U.S. Cl. ........................................ 74/198; 74/200
[58] Field of Search ................ 74/200, 198, 721, 208, 74/214, 215, 216, 796

[56] References Cited

U.S. PATENT DOCUMENTS

| | | | |
|---|---|---|---|
| Re. 29,631 | 5/1978 | Schott | 74/198 |
| 312,171 | 2/1985 | Shaw | 74/198 |
| 2,512,717 | 6/1950 | Dicke | 74/198 |
| 2,660,897 | 12/1953 | Neidhart et al. | 74/208 |
| 2,682,776 | 9/1954 | Morgan | 74/198 |
| 2,727,396 | 12/1955 | Haugwitz | 74/198 |
| 2,748,614 | 6/1956 | Weisel | 74/200 |
| 3,039,238 | 6/1962 | Christensen | 74/796 |
| 3,154,957 | 11/1964 | Kashihara | 74/198 |
| 3,216,283 | 11/1965 | General | 74/730 |
| 3,237,468 | 3/1966 | Schottler | 74/198 |
| 3,267,755 | 8/1966 | Isely | 74/198 |
| 3,269,190 | 8/1966 | Laman | 74/471 |
| 3,272,025 | 9/1966 | Stieber | 74/198 |
| 3,395,589 | 8/1968 | Gersten | 74/471 |
| 3,398,592 | 8/1968 | Bran | 74/198 |
| 3,513,714 | 5/1970 | Jennings et al. | 74/198 |
| 3,826,157 | 7/1974 | Stoll | 74/198 |
| 3,845,663 | 11/1974 | Blomberg et al. | 74/198 |
| 3,975,278 | 8/1976 | Wygant | 74/215 |
| 3,987,685 | 10/1976 | Opocensky | 74/471 |
| 4,011,765 | 3/1977 | Tippmann | 74/193 |
| 4,020,710 | 5/1977 | Gassner et al. | 74/215 |
| 4,024,771 | 5/1977 | Joseph | 74/198 |
| 4,302,618 | 11/1981 | Washecheck | 74/215 |
| 4,391,156 | 7/1983 | Tibbals, Jr. | 74/198 X |

Primary Examiner—Leslie Braun
Assistant Examiner—David Novais
Attorney, Agent, or Firm—John E. Reilly

[57] ABSTRACT

An infinitely variable speed drive mechanism which is specifically adaptable for automotive applications is made up of a single ball or spherical element interpositioned between drive and driven members in opposed facing relation to one another on opposite sides of the ball, each of the drive and driven members having generally annular, frusto-conical surface portions engageable along one of the surfaces of engagement with the ball, and control rollers are mounted under compression against a surface portion of the ball so as to urge the ball into balanced frictional engagement with the drive and driven members while establishing the axis of rotation of the ball and determining the speed ratio imparted through the ball between said drive and driven members.

7 Claims, 9 Drawing Figures

FIG. 7

SINGLE BALL TRACTION DRIVE ASSEMBLY

This application is a continuation application of Ser. No. 346,289, filed Feb. 5, 1982, now abandoned for SINGLE BALL TRACTION DRIVE ASSEMBLY, invented by E. C. Tibbals, Jr.

This invention relates to variable speed drive mechanisms, and more particularly relates to a novel and improved infinitely variable speed drive mechanism for regulating the torque and speed ratio between a pair of drive and driven members and which is specifically adaptable for use in coupling a motor drive or engine to an automotive transmission.

BACKGROUND AND FIELD OF THE INVENTION

Variable speed drive mechanisms have been devised which customarily employ a plurality of balls suspended within a special cage and interpositioned between rotatable drive and driven members so as to be capable of imparting rotation of the drive member to the driven member as determined by a sphere whose axis of rotation is dictated by pivotal follower elements or rollers. Representative of this approach are disclosed in U.S. Pat. Nos. Re. 29,631 to L. A. Schott; U.S. Pat. No. 312,171 to H. S. H. Shaw; U.S. Pat. No. 3,154,957 to M. Kashihara; and U.S. Pat. No. 4,011,765 to H. Tippmann. Of these patents, Kashihara is of interest for disclosing a single ball drive for transmission of relatively large torques by employing a dish-shaped drive wheel and driven wheel on diametrically opposed surfaces of a spherical member, the axis of rotation of the spherical member being controlled by a ball bearing assembly. Other patents of general interest in the field are U.S. Pat. Nos. 2,512,717 to R. H. Dicke; U.S. Pat. No. 682,776 to P. S. Morgan; U.S. Pat. No. 2,727,396 to Haugwitz; U.S. Pat. No. 3,039,328 to H. W. Christenson; U.S. Pat. No. 3,237,468 to H. Schottler; U.S. Pat. No. 3,216,283 to N. T. General; U.S. Pat. No. 3,267,755 to W. H. Isely; U.S. Pat. No. 3,269,190 to G. M. Laman; U.S. Pat. No. 3,272,025 to O. Stieber; U.S. Pat. No. 3,395,589 to M. Gersten; U.S. Pat. No. 3,398,592 to J. Brany; U.S. Pat. No. 3,513,714 to M. D. Jennings et al; U.S. Pat. No. 3,826,157 to C. C. Stoll; U.S. Pat. No. 3,987,685 to W. J. Opocensky; and U.S. Pat. No. 4,024,771 to B. C. Joseph.

Although it has been proposed previously to employ fixed ratio drives of the frictional ball and roller type in automotive applications so as to maintain the speed of rotation of the engine constant as the resistant torque applied to the wheels is varied, it has been impractical to accomplish the same through the provision of a single ball and single pair of rollers, as alluded to in the aforementioned patent to Haugwitz; and particularly in the transmission of appreciable torque. Haugwitz concluded that a single ball with one pair of control rollers associated with it would be incapable of the necessary control over variations in speed, particularly in high torque applications, such as, automotive transmissions. As a result, in Haugwitz and subsequent developments of variable speed drive mechanisms, the approach has been to design the variable speed transmission with two or more balls each having its own gimbal and control roller members arranged in surrounding relation to the drive and driven members. This has necessitated rather elaborate design considerations particularly in the mounting and disposition of the balls so as to be freely journaled in a cage while making the cage itself pivotal in determining the speed ratio between the input and output side of the transmission. In addition to the aforementioned patents, another patent representative of the multi-ball approach in a variable speed drive is that to Floyd U.S. Pat. No. 3,071,018.

Accordingly, among the deterrents to single ball drives has been the inability to balance the forces applied to different points on the surface of the ball while having a ball large enough to transmit substantial horsepower. An associated deterrent has been to design a bearing structure for the input and output sides of the transmission which will adequately support the asymmetrical forces attendant to the operation of a single ball; and, equally as critical, to devise a control roller assembly which will establish the necessary degree of osculation so as to be capable of closely controlling the axis of rotation of the ball with respect to the drive and driven elements and make the transmission highly sensitive to desired changes in speed and torque. Nonetheless, utilization of a single ball drive offers a number of offsetting advantages if the aforementioned difficulties can be satisfactorily overcome. For instance, the single ball drive creates a synergistic effect in that a single ball of a given diameter is capable of transmitting considerably more horsepower than are two balls, each of which is one-half the diameter of the single ball; further a single ball will avoid unnecessary multiplication of parts and control elements, substantially reduce the overall size of the transmission and indeed result in higher efficiency, vastly reduced weight and minimize the degree of control required over the operation of the entire system. These advantages are of particular importance in automotive applications where size and weight considerations previously encountered in the application of frictional ball and roller technology to variable speed drives have effectively eliminated them from consideration. Here, reference is made to my copending application Ser. No. 207,190, filed Nov. 10, 1980 for ELECTRIC MOTOR DRIVE WITH INFINITELY VARIABLE SPEED TRANSMISSION, now U.S. Pat. No. 4,391,156 assigned to the assignee of the present invention, and incorporated by reference herein. As disclosed in said copending application for patent, a DC motor drive is coupled to a variable speed transmission through a flyball governor system, the latter operating a movable control member which is shiftable or pivotal to vary the speed ratio between the input and output sides of the transmission over a predetermined range. A predetermined resistance is imposed on the movement of the flyball governor so that the acceleration of the output side of the transmission is controlled independently of that of the motor drive with the maximum speed obtainable being matched to the most efficient operating speed level of the motor. Thus, the speed ratio of the transmission is established so that at lower vehicle speed ranges, the load requirements on the motor are minimized by being set at a predetermined ratio; and as the motor is accelerated the speed ratio will be gradually reduced to a ratio which will permit the motor to be operated at its most efficient performance level while delivering maximum power through the transmission. The present invention may be exemplified by its use in combination with such a motor drive as well as internal combustion engines and specifically in such a way as to be capable of delivering maximum horsepower through a single ball while greatly reducing the weight and size of the transmission, improving its wear and performance characteristics and enabling close sensitive control over the speed ratio between its input and output sides.

SUMMARY OF INVENTION

It is therefore an object of the present invention to provide for a novel and improved variable speed drive which is conformable for use in various applications requiring close sensitive control of the speed ratio between an input and output member but having special application for use in high torque and high horsepower applications, such as, automotive transmissions.

It is another object of the present invention to provide for a novel and improved infinitely variable speed drive of the free frictional ball and roller type which will establish increased surface contact or osculation between the variable speed control and the drive and driven members, and further wherein an improved ratio control automatically prevents the application of torque through the drive over a predetermined range of speed ratios which would otherwise damage the torque-transmitting elements of the drive.

It is an additional object of the present invention to provide in an infinitely variable speed drive transmission for the close, highly sensitive control over the speed ratio between drive and driven members, reduced temperature and wear while substantially reducing the number of parts and control elements required.

It is another object of the present invention to provide in a variable speed drive for a novel and improved bearing construction for the balanced application of forces between the input and output members together with improved means of speed control therebetween and which is capable of operation over a wide range of speeds.

It is still a further object of the present invention to provide for a new and improved variable speed transmission capable of being used either in combination with a DC motor drive or internal combustion engine in such a way as to achieve maximum torque requirements at lower input speeds of operation and minimum torque requirements at higher speeds of operation, yet, will maintain the motor drive operation at its most efficient performance level.

In accordance with the present invention, a variable speed transmission employs drive and driven members each coupled through a torque sensing roller cam to a generally ring-like member having an internal conical surface frictionally engaging spaced points on a common ball therebetween, the points of engagement being symmetrical about a common plane which extends through the center line of engagement of one or more control rollers. The control rollers are mounted under compression to bear against the ball over a broad surface area of engagement and are pivotal about an axis of rotation which will determine the speed ratio between the drive and driven members and in such a way that the range of speed may vary theoretically from zero to infinity while imparting rotation in either direction to the driven member.

A novel form of bearing arrangement has been devised to support the internal conical surface on the driving side within a housing partially filled with a tractant material as the necessary driving force is imparted through the ball. Associated therewith is a novel form of oil circulation system. The internal conical surface on the output side of the mechanism similarly is provided with a novel and improved bearing arrangement which will absorb any play introduced into the mechanism, compensate for torque changes, and consistently maintain the necessary minimum normal force between the ball and conical surface on the output side. The output bearing is utilized in combination with a novel and improved coupling into the output shaft so as to effectively absorb any backlash otherwise transmitted back from a high resistant torque member to be driven.

The foregoing and other characteristics of the present invention make it ideally suited for use in automotive transmissions and particularly those of the type employed in combination with electric vehicles. In a typical application, either a DC motor drive or internal combustion engine is coupled to the input side of the variable speed transmission with the output side of the transmission coupled through the differential with the ground-engaging wheels. In the electric motor drive, the control rollers are shiftable to vary the speed ratio between the input and output sides of the variable speed drive under the control of a centrifugal flyball ratio controller system which, for example, is responsive to rotation of the motor drive to vary the speed and torque ratio of the variable speed drive; and a resistance compensator associated with the centrifugal flyball ratio controller serves to control the acceleration and speed at the input side of the variable speed drive independently of the load imposed on the output side while matching the speed ratio for any given output speed of the drive to the most efficient operating level of the DC motor as disclosed in my hereinafter referred to copending application for patent.

In an alternate form of the present invention specifically adaptable for use in combination with internal combustion engines, a single ball variable speed drive incorporates novel means at its output side to relieve the application of torque at predetermined speed ratios to thereby avoid overload conditions in the drive which could otherwise cause failure of the unit.

The above and other objects, advantages and features of the present invention will become more readily appreciated and understood from a consideration of the following detailed description of a preferred embodiment of the present invention when taken together with the accompanying drawings of a preferred embodiment of the present invention, in which:

DETAILED DESCRIPTION OF AN EMBODIMENT FOR ELECTRIC MOTOR DRIVES

Figure 1:
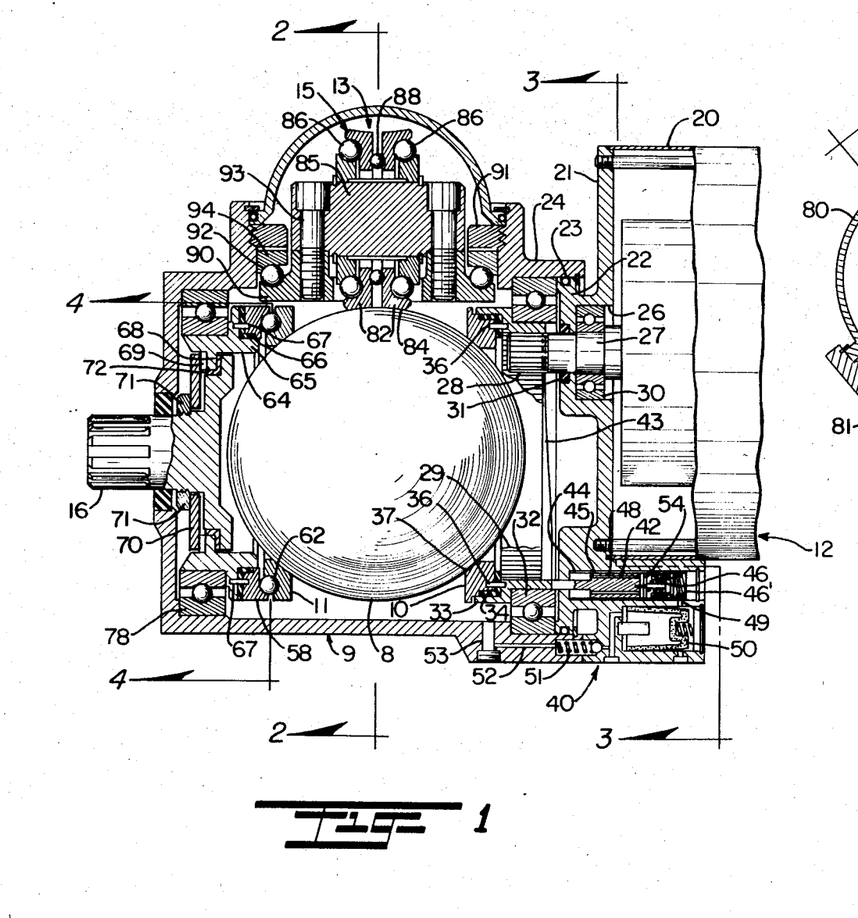
FIG. 1 is a cross-sectional view of a preferred form of variable speed drive mechanism in accordance with the present invention.
Figure 2:
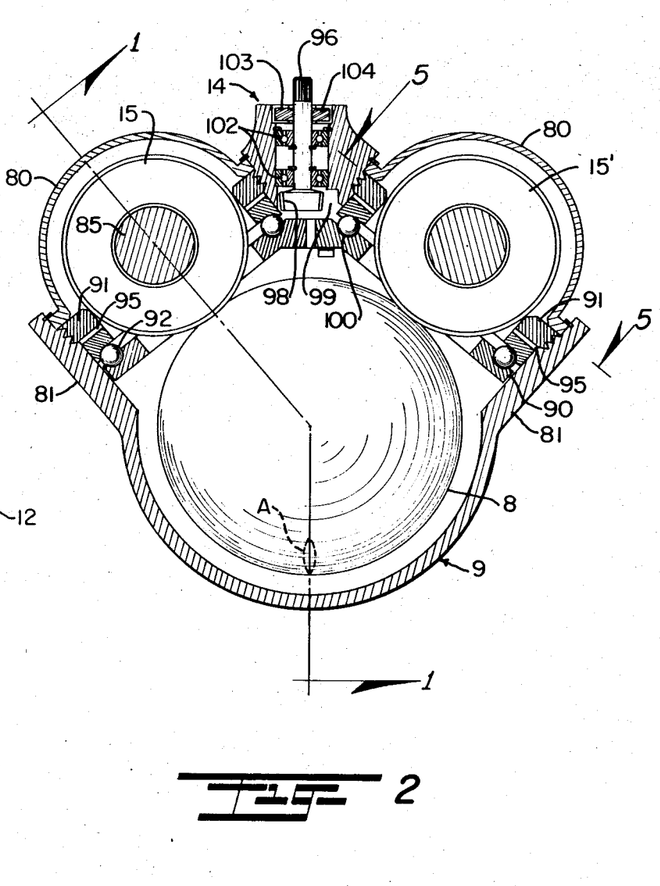
FIG. 2 is a sectional view taken about lines 2—2 of FIG. 1.
Figure 3:
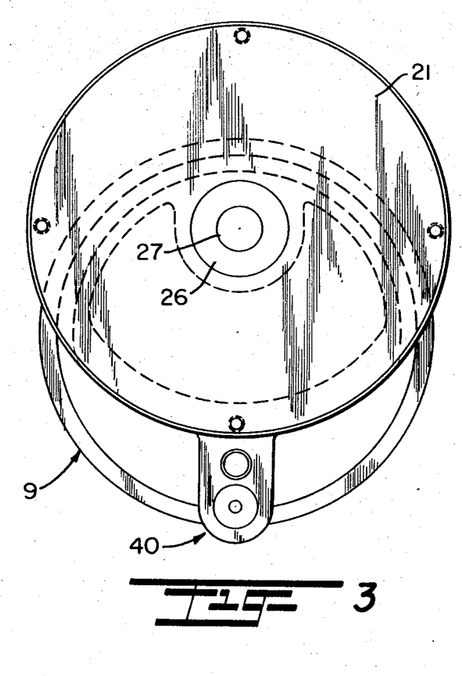
FIG. 3 is a cross-sectional view taken about lines 3—3 of FIG. 1.
Figure 5:
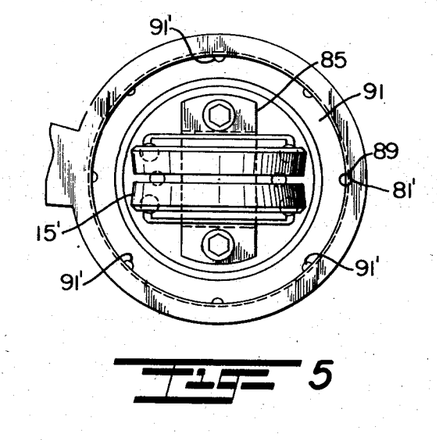
FIG. 5 is a sectional view taken about lines 5—5 of FIG. 4.
Figure 6:
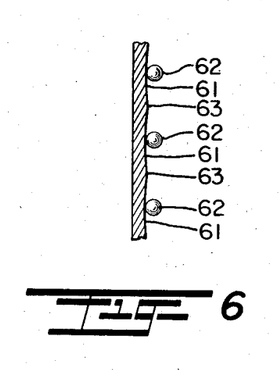
FIG. 6 is a cross-sectional view of one of the control roller assemblies taken about lines 6—6 of FIG: 1.

Referring in more detail to the drawings, the form of the present invention as shown in FIGS. 1 to 6 is broadly comprised of a single ball or spherical element 8 which is interpositioned within a housing 9 between a drive ring 10 and a driven ring 11. In a manner to be described, the input or drive ring 10 is arranged so as to establish localized contact at one point on its surface with the lower surface of the ball 8 so as to impart rotation thereto and which rotation is imparted to the driven ring 11. The rotation imparted to the driven ring 11 relative to the drive ring 10 is established at a ratio determined by the angle of a control roller assembly 13 which is located symmetrically about a radial line through the center of the ball and symmetrically between the angles established by the contact areas of the drive and driven rings with the lower surface of the ball. More specifically, as illustrated in FIG. 2, there are a pair of control roller assemblies 13 separated by a pivotal control rod assembly 14 which simultaneously pivots each pair of control rollers 15 of a roller assembly 13 about independent axes to establish the desired axis of rotation of the ball 8. By mounting the control rollers 15 under compression, the ball 8 is urged into engagement with the lower surfaces of the drive and driven rings 10 and 11, and the degree of pressure exerted at the points of contact of the drive and driven rings is determined by the compressional loading of the control rollers 15. The following will serve to illustrate the manner in which the speed ratio is established between the drive and driven rings 10 and 11: as shown in FIG. 1, if the rotational axis designated at p through each of the control rollers 15 is parallel to the horizontal axis H of the ball 8 extending through output shaft 16, when the ball is driven by the input ring 10 it will rotate about the horizontal axis H as described so that the driven ring 11 will rotate at the same rate of speed and in the same direction as the input ring 10. If the control rollers 15 making up the assembly 13 are pivoted about their axes p through equal angles but in opposite directions to one another by the control or adjustment rod 14. Such as, p' as illustrated in FIG. 5 the axis of rotation H of the ball 8 will be shifted so that it will rotate about a modified axix H' which extends through the point of intersection of the rotational axes of the control rollers 15, as a result of which the relative velocity of the driven ring 11 will be reduced with respect to that of the drive ring 10. Should the control rollers 15 be pivoted to an angle such that their axes have a common intersection with an axis through the point of contact of the ball 8 with the driven ring 11 whereby the ball 8 is effectively rotated about an axis through the point of contact with the driven ring 11, it will be apparent that the speed ratio is equal to infinity and the speed of the driven ring will be zero. If, the control rollers are pivoted to an angle approximating 90° from the relationship as shown in FIGS. 1 and 2, the axis of rotation of the ball 8 is such that the driven ring rotates in a direction opposite to that of the drive ring but at the same speed.

It will be appreciated from the foregoing principles that the rotation of the drive ring can be efficiently imparted by frictional contact with the ball 8 into the driven ring 11 if the necessary contact pressure is maintained between the control rollers, drive and driven rings and the ball so as to substantially eliminate any slippage between the engagement surfaces. In this relation, a single ball represents the most effective approach to variable speed drives: For example, a single ball of 7" diameter arranged in accordance with the present invention is capable of delivering three times the torque and horsepower as a plurality of four balls of 2" diameter, yet the assembly would be approximately one-half the size of a multi-ball drive mechanism.

Considering in more detail the construction and arrangement of the first form of invention, the motor drive 12 is mounted in a separate housing 20 at one end of the main housing 9 and includes a front cover 21 provided with a forwardly directed flange 22 with a seal 23 between the flange 22 and inner wall surface 24 at one end of the housing 9. A central opening 26 accommodates a drive shaft 27 driven by the motor 12 which is provided with a pinion 28 at its leading end which projects into intermeshing engagement with the inner surface of a ring gear 29. The drive shaft 27 is journaled in the front cover 21 by a ball bearing 30, and a suitable seal 31 is disposed at the leading end of the surrounding edge of the opening 26 so as to seal the drive shaft from the interior of the housing.

The ring gear 29 is journaled for rotation in a bearing 32 and has a forward extension 33 which forms a shallow cup-shaped end for reception of an annular rubber gland 34 and the drive ring 10. The drive ring 10 is of annular configuration and is keyed to the forward extension 33 by means of circumferentially spaced drive pins 36 so that the rotation of the ring gear is directed through the washer element or gland 34 to the drive ring 10, the washer 34 being operative to absorb the vibrations between the ring gear 29 and ball 8 when in operation. The drive ring 10 has a generally conical or concave surface 37 which defines the ball contacting surface and is positioned to engage the ball at an angle of approximately 37° to the vertical center line through the axis of the ball as viewed in FIG. 1. When downward pressure is applied by the control roller assembly 13, it will urge the ball into engagement with the ring 10 along a localized area which will take on the appearance as generally represented at A in FIG. 2. Any rearward or reaction forces of the ball 8 against the drive ring 10 are absorbed in the ball bearing 32 which is preferably an XPO Series Kaydon type ball bearing having the capability of absorbing axial and radial thrusts as well as moment loading. Most importantly, the ball bearing is capable of absorbing moments or unbalanced loading resulting from the force applied by the ball against the surface of the drive ring within a single bearing arrangement. At the same time, the washer element 34 is capable of damping any vibrations imparted by the ball into the drive ring as the drive ring rotates the ball and thereby greatly minimizes brenelling and fatigue or spalling.

The offset mounting of the motor drive 12 with the pinion-engaging upper surface of the ring gear 29 establishes the most compact arrangement between the motor drive housing and main housing 9. Also sufficient space is afforded at the lower end of the housing facing the motor drive 12 to accommodate an oil circulation assembly as generally designated at 40. The housing is completely filled with a special lubricant, preferably Santotrack sold by Montsano Chemical Co. of St. Louis, Mo. In order to clean the tractant oil circulation means as indicated at 40 effects a continuous recirculation of oil through the housing. This is accomplished in a unique manne through utilization of an elongated oil plunger 42 having its forward end engageable with a cam surface 43 on the rearward end surface of the ring gear 29. As the ring gear 29 rotates, the cam surface 43 will cause working or longitudinal movement of the plunger through bore 44 which has an inner steel liner or sleeve 45, the oil plunger being normally urged forwardly under the force of a compression spring element 46. It will be noted that the rearward end of the plunger 42 is enlarged so as to slide in close-fitting relation through the sleeve 45 and is provided with a series of circumferentially spaced apertures 48 so that as the plunger is urged forwardly, oil is permitted to flow rearwardly through the plunger and into a bore 49 in the rear end wall of the plunger housing. On the rearward stroke of the plunger, the oil is forced through a sintered bronze filter 50 and through a check valve 51 into a forwardly directed bore 52 communicating with a laterally directed bore 53 into the main internal area of the housing surrounding the ball 8. As the plunger is caused to move rearwardly during each cycle of revolution of the cam, it will advance against a rubber seal element 54 which is yieldingly supported by outer spring element 46.

On the output side of the ball, the driven ring 11 comprises the inner race of a bearing member having an outer stationary race 58 and a series of circumferentially spaced balls 62 therebetween. As seen from a consideration of FIGS. 4 and 5, the races 11 and 58 have confronting surfaces which define a series of cam tracks 61, there being one for each ball 62, and each track 61 is formed with convergent ramps 63 at each end of a track and which ramps 63 converge toward one another so as to absorb normal loading and permit axial displacement between the races. In addition, the race 11 has an inner conical or generally concace surface 60 which is engageable with the ball 8 along a localized surface portion directly opposite to the surface of engagement of the drive ring with the ball so that rotation of the ball 8 is imparted to the driven ring 11 through the lower surface of engagement as at B. If the torque applied by the ball 8 through the driven ring is small, there is no angular displacement between opposed races 11 and 58 and they will effectively rotate as one member. However, under increases in torque, the balls 62 will roll with respect to each cam track and, in rolling along the ramps 63 will force axial separation of the races 11 and 58 so as to increase the loading on all parts of the drive. As they continue to roll, the balls 62 will statically support the load that is transmitted by the ball 8. Assuming that the torque remains constant, no angular displacement between the inner and outer races 11 and 58 will occur; however, when the torque increases, the balls 62 will begin to roll along their respective cam tracks forcing the axial separation of the races 11 and 58 and increasing the loading on all of the parts of the drive. At the same time, they must continue to dynamtically support the load transmitted through the main ball 8 to the driven ring 11.

Figure 4:
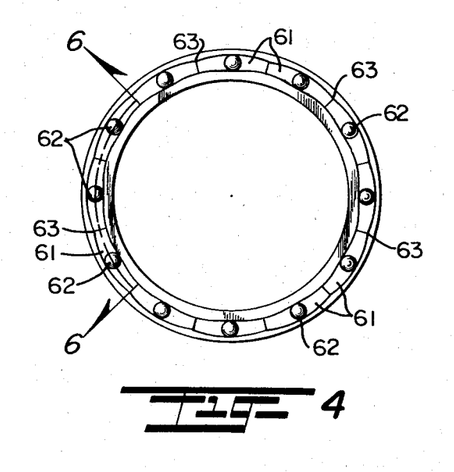
FIG. 4 is a cross-sectional view of a preferred form of bearing on the driven or output side of the variable speed drive mechanism and taken about lines 4—4 of FIG. 1.

In order to transmit the torque from the driven ring 11 into the output shaft 16, the race 58 is mounted in surrounding relation to a shoulder 65 which projects from a circular collar 64 at the inner end of the output shaft 16 and is separated from the shoulder by an annular rubber gland 66 which serves the same function as the gland 34 for the drive ring. Similarly, pins or keys 67 are arranged at circumferentially spaced intervals for interconnection of the race 58 and the collar 64, and collar 64 is journaled for rotation in a bearing 78 mounted within the end of the housing. The collar 64 has an inwardly projecting flange 68 which is mounted in pressfit relation together with a wear pad 69 within a recess formed between the base 76 of the output shaft 16 and a belleville spring 70 which is secured in place on the shaft by means of a nut 71. Any sudden increase in torque directed to the driven ring 11 may cause the collar 64 to rotate with respect to the output shaft 16 and avoid possible damage to the output shaft and other internal parts of the drive. Further, spring 70 is keyed in such a way as to continue rotating with the output ring while the base 76 of the output shaft remains stationary; or in other words the collar 64 operates as a clutch and will slip with respect to the base of the output shaft 16 if there is extreme resistance to turning by the output shaft. Another annular washer element 72 is of generally L-shaped cross-section and cooperates in compressing or urging the collar 64 and particularly the inner flange on the collar against the spring 70 as well as to aid in supporting the wear pad 69 in position against the flange 65 on the collar 64.

A pair of generally dome-like covers 80 are secured in place to upper ends of cylindrical extensions 81 of the main housing 9 and serve to enclose the roller pairs 15 and 15' in circumferentially spaced relation to one another, the roller pairs, as shown in FIGS. 1 and 2, engaging the ball symmetrically with respect to a common vertical center line extending upwardly from the center of the ball 9 through the control rod 14. Specifically, each roller pair is composed of an E52100 ball bearing steel material having radially extending portions 82 which terminate in outer circumferential, broadened ball-engaging surface portions 84. The roller pairs 15 and 15' are mounted in journaled relation to a common shaft 85 by ball bearing assemblies 86, and the rollers are made to be rotatable independently of one another by a series of ball bearings 88 interposed in circumferentially spaced relation between the radial facing surfaces of the radially extending portions 82. The shaft 85 is secured in turn to an inner race 90 of a ball bearing arrangement 92 by suitable bolts 93 which extend downwardly through opposite ends of the shaft into the inner race 90. An outer rotatable race 94 is assembled and secured in position by a lock nut 91 which threadedly engages the internal wall surface on the housing extension 81, the nut 91 being separated from the rotatable base by a high coefficient of friction elastomeric washer 95 so as to permit free rotation of the outer race 94 both with respect to the nut 91 and the inner race 90.

By virtue of the direct interconnection of the inner race to the shaft 85, and as best seen from FIG. 2, the control rod assembly 14 is capable of rotating the inner race 90 in order to set the angles of the roller pairs. This is accomplished through a bevel gear 98 at the lower end of control rod 96, the gear 98 interengaging another bevel gear 99 interposed between a gear surface 100 on each race for the roller pair 15 and 15'. The control rod assembly 14 is suspended by axially spaced bearings as designated at 102, and a seal 104 is supported in position by a spring element 103 at the upper end of the control rod 96 at its point of entry into the central opening formed between the dome-like covers 80.

Important to a consideration of the manner and means of mounting the control rollers 15 and 15' and their operation with respect to the ball is the construction and arrangement of the individual rollers and particularly with the broadened surface areas 84 which are of generally concave configuration and complementary to the ball surface so as to engage the external surface of the ball 8 over a relatively broad area. Further, it will be evident that the degree of loading of the control rollers against the ball 8 is regulated principally by the degree of tightening of the nut 91 within the housing extension 81. FIG. 5 illustrates one means of tightening or preloading the control rollers 15 and 15' toward the center or axis of the ball so as to force the ball downwardly in the housing. When the ball is forced downwardly, it will of course load both the drive and driven rings 10 and 11. This is accomplished by threaded adjustment of the externally threaded rings or nuts 91. The degree of preloading is of course established by the degree of tightening of the ring 91 and its adjustment so as to align one of the pockets or half-circles 91' on its external surface with a mating pocket 81' on the inner wall of the housing extension 81. A pin 89 is then inserted into the aligned half-circles or pockets to retain the ring 91 in its adjusted position. Independent adjustment of each of the roller pairs by their respective rings 91 in the manner described permits differential adjustment of the distances between the control rollers necessary to properly center the ball 8 in the drive. Thus, since there will be a tendency to lift the ball 8 off the surface of one pair of roller pairs and to exert greater pressure against the other pair of control rollers when the ball is driven in one direction, the first pair of control rollers should be preloaded to a greater degree than the other pair to compensate for this tendency.

It will be seen that the surface area of engagement of the control rollers with the ball 8 is much greater than that of the drive and driven rings so as to better absorb the hertz stresses imposed by the ball on the control rollers. In other words, the degree of osculation of the roller pairs 15 and 15' is on the order of five times that of the input and output races with the ball since there is approximately a 50% higher hertz stress on the control rollers than on the races, or drive and driven rings. At the same time, the angle of separation between the control rollers; i.e., the included angle formed between radial lines extending from the center of the ball through the points of contact of each of the roller pairs, should correspond to the angle of separation between the points of contact of the drive and driven rings 10 and 11 with the ball in order to effect uniform loading.

In the assembly of the variable speed drive mechanism, the amount of preloading of the control rollers by means of the nut 91 can be closely regulated with the use of a torque meter; yet at the same time, sufficient pressure is maintained to insure non-slipping engagement between the rings 10 and 11 and the ball under low torque conditions.

In operation, the speed ratio between the input and output rings is determined by the actual ratio of the diameters of the circle that the output race runs on to the circle that the input race runs on. Thus, if a ratio of 8:1 is desired, the control rollers must be set such that the diameter of the path of the output race is approximately 1⅝" for a 5" ball since it must be ⅛th of the diameter of the circle along which the input is driven.

Among other characteristics of the drive is the ability to use single bearings to support the substantial loads and torques applied by the input ring through the control rollers to the output rings, in particular the highly non-linear nature of increasing the ball ramp on the output bearings to enable tremendously increased transmission of horsepower. For instance, if an 8 millimeter diameter ball is employed, it is possible to transmit 1/20th horsepower. If the ball was increased to 50 millimeters, roughly a 6:1 increase in size, a 400:1 increase in horsepower can be transmitted since the surface area between the rings, control rollers and ball is substantially increased and the operating radius is also increased.

The particular form of bearing employed on the output ring can also be used on the input ring. The spherical element or ball 8, races 10 and 11 as well as the control rollers 15 and 15' are preferably composed of a material such as an M-50 tool steel or vacuum melted vacuum degassed E52-100 high chrome steel.

DETAILED DESCRIPTION OF AN ALTERNATE EMBODIMENT FOR INTERNAL COMBUSTION ENGINES

Figure 7:
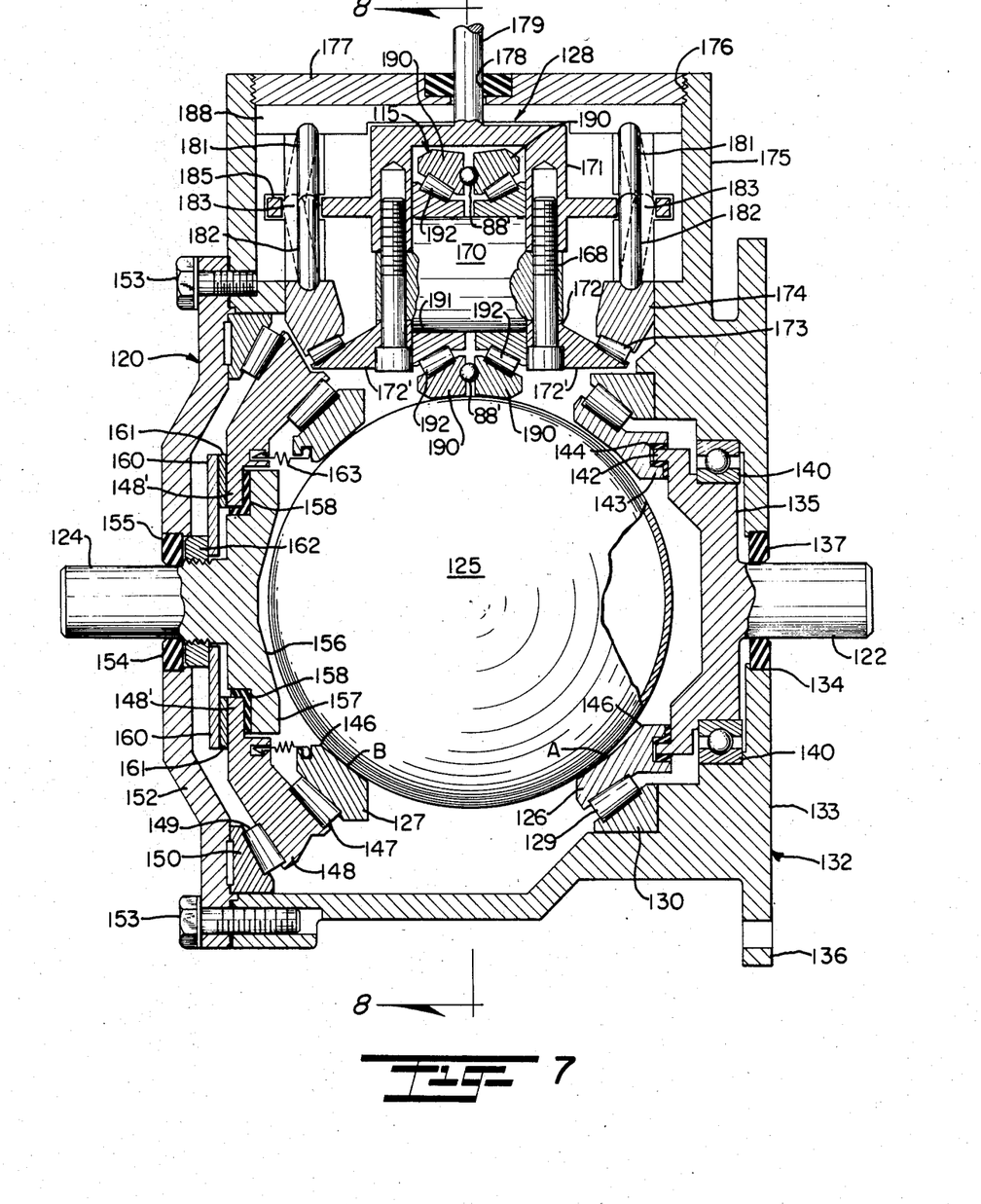
FIG. 7 is a cross-sectional view of an alternate form of invention adaptable for use with internal combustion engines.
Figure 8:
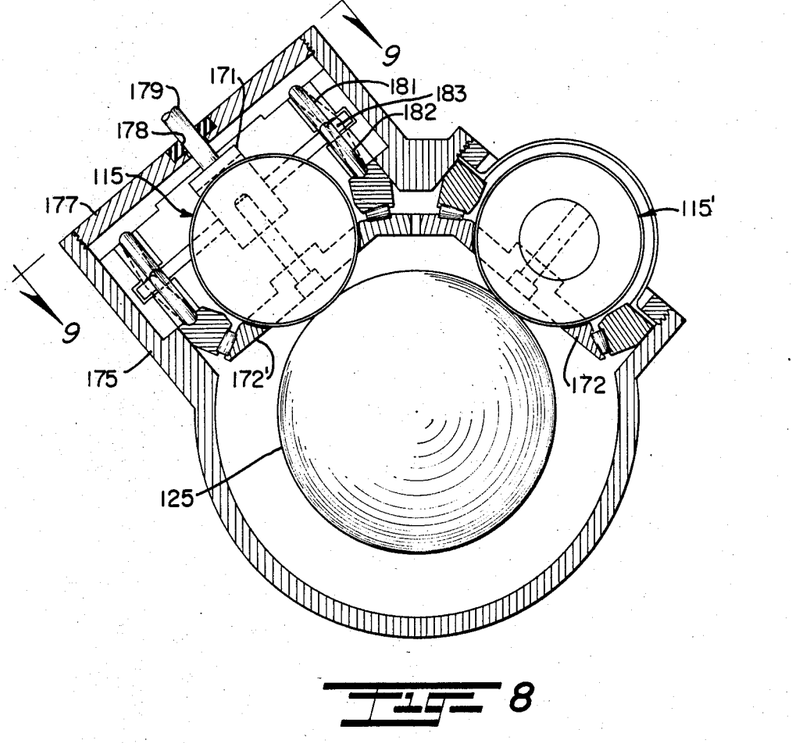
FIG. 8 is a cross-sectional view taken about lines 8—8 of FIG. 7.
Figure 9:
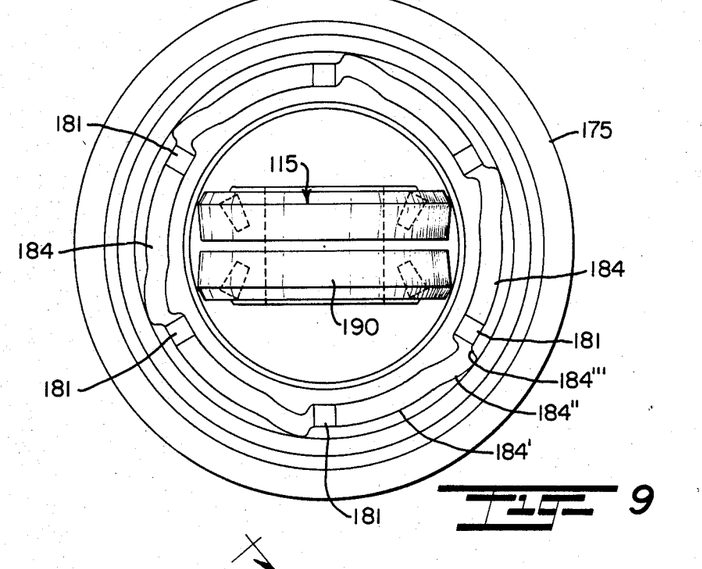
FIG. 9 is a view taken at lines 9—9 of FIG. 8.

In the form of invention illustrated in FIGS. 7 to 8 a variable speed drive mechanism generally designated at 120 is specifically adaptable for use with an internal combustion engine and wherein, for example, the input shaft 122 may be connected to the flywheel of an engine, not shown, and the output shaft 124 is coupled to the differential mechanism into the rear axle for the ground-engaging wheels, not shown. Again, a hollow spherical member or ball 125 is suspended for rotation between a drive ring or input race 126 and a driven ring or output race 127 under the control of roller assembly 128.

The drive ring 126 defines the inner race for a series of tapered or frusto-conical rollers 129 arranged on axes generally in outer spaced concentric relation to a tangent along the external surface of the ball and mounted in an outer stationary race 130. The stationary race 130 is mounted in an annular, recessed portion of a housing partially housing with oil represented at 132 and which housing includes an end wall 133 provided with a central opening 134 for projection of the input shaft 122 from a generally circular mounting plate 135 for the inner race. The end wall 133 has an outer radial flange 136 to facilitate connection of the entire housing to a suitable flywheel housing, not shown, and a spring-mounted seal 137 affixed in the opening 134 is disposed in surrounding relation to the external surface of the shaft 122. In addition, the mounting plate 135 is suspended for rotation independently of the housing by an X contact, Kaydon-type bearing 140 which supports the input shaft. The mounting plate 135 includes an axially directed end 142 which is insertable into an annular recess 143 at one end of the inner race or drive ring 126, the annular recess 143 provided with a rubber gland 144 to absorb torsional vibrations.

Both the input race 126 and output race 127 are of annular configuration and correspondingly formed with inner facing surfaces 145 and 146, respectively, defining flat-walled conical surfaces in a direction tangentially of the ball 125 with lower contact points established as at A and B engageable with opposed lower surface portions of the ball 125 supported on tapered roller bearings 129 and 149.

The output race 127 serves as an inner race of a cam which includes a series of tapered or generally conical rollers 147 disposed for rotation between the inner race 127 and intermediate race 148, the latter being journaled for rotation within a series of outer tapered rollers 149 which are seated between the race 148 and outer stationary race 150. The race 148 and race 127 have cam tracks on their confronting surfaces corresponding to those illustrated in FIG. 4 and designated 63 and 64, respectively, so that the roller elements 149' will perform the same function as the torquesensing balls 62; i.e., they will in proportion to an increase in torque applied to the output shaft 124 increase the pressure or force of engagement at the contact points A and B as well as the contact points between the control roller pairs 115 and 115' and ball 125. The bearing race 150 is secured in place at the end of the housing 132 by end wall 152 which is bolted as at 153 across the end of the housing with a central opening 154 surrounded by a spring-loaded seal 155 for rearward or outward projection of the output shaft 124. The output shaft has torque imparted to it from the driven ring 127 through a generally circular, enlarged flange 156 at the inner end of the output shaft within the housing and which flange is provided with a shoulder 157. The friction pad 158 is disposed on the shoulder 157 and a radially inwardly directed projection 148' on the intermediate race 148 is positioned for insertion into close-fitting engagement with the pad 158 by a washer element 160 which is disposed against a bearing pad 161. The washer 160 is secured firmly against the pad 161 by a threadedly adjustable nut 162 at the inner end of the output shaft 124 and housed directly beneath the seal 155. A series of return springs 163 extend in circumferentially spaced relation between the races 127 and 148 to normally urge the race 127 into engagement with the ball 125.

The control roller assembly 128 comprises two sets of roller pairs 115 and 115' which, as seen from FIGS. 7 and 8, are symmetrically disposed with respect to a vertical center line through the axis of the ball 125. Each of the roller pairs 115 and 115' generally corresponds to the mounting and intended operation of the roller pairs 15 and 15'0 as illustrated in FIGS. 1 to 5. Thus, each roller pair 115 and 115' has a pair of outer races or broadened, surface-engaging portions 190, each portion 190 being independently journaled on roller bearings 192 which in turn are mounted on inner races 191, the latter being supported on a common central stub shaft 170. The outer race portions 190 are rotatable independently of one another about ball bearings 88' which are disposed in circumferentially spaced relation between the radial facing surfaces of the outer races 190. The shaft 170 has opposite ends clamped between an outer yoke member 171 and an inner support member 172 by cap screws 168 which project upwardly through the inner support 172 into threaded engagement with bores formed in the yoke 171. The support member 172 is of generally annular configuration and has an outward tapered extension 172' which serves as the inner race for a series of tapered bearings 173. The bearings 173 are interposed between the inner race 172' and an outer race 174. The outer race 174 is mounted in the inner wall of housing 132, and each of the roller pairs 115 and 115' are housed within a generally cylindrical extension 175 of the housing 132, each extension 175 having an internally threaded portion 176 adapted to receive a retainer plate 177.

A sealed central opening 178 permits outward projection of a centering shaft 179 which regulates the rotational setting of the control rollers and the speed ratio between the input and output shafts as described with reference to the form of FIGS. 1 to 6. In this form of invention, however, the loading or compression of the roller pairs 115 and 115'0 is self-adjusting in operation through a knuckle joint assembly 180 which is comprised of circumferentially spaced pairs of knuckle rods 181 and 182, each pair being free to pivot or swivel about a common center 183, the common centers or joints of the knuckle pairs being disposed in a generally circular cam track 184 of a cam 185 which projects radially in an outward direction from the yoke 171. It will be seen that the track segment for each knuckle joint extends along a generally circular path 184' then diverges outwardly for a limited distance as represented at 184'', then has a sharp return 184''' into the next track. In this way, as the control rollers are pivoted in a direction forcing the axis toward the minimum speed point illustrated by the dotted line L in FIG. 7, the section of the cam track 184' will be advanced into engagement with the knuckles or toggle elements 183 thus permitting the race 174 to slide upwardly along the inner wall of the housing and relieve the tension or precompression on the roller pairs.

The knuckle joint assembly 180 is normally retained in position with each upper rod 181 bearing against an upper retainer plate 188 which is adjustably secured against the top of the yoke 171 by the annular plate 177, and the lower leg 182 of each knuckle joint assembly 180 is partially inserted into a depression in the upper end surface of the race 174. In this way, the retainer plate 188 will force the upper end of the knuckle elements downwardly against the race 174 and cause the race 174 to preload the roller pairs 115 and 115' against the surface of the ball 125.

The rotational setting of the roller pairs 115 and 115' is again controlled through a gimbal represented at 190, of the same type as disclosed in more detail in the form of FIGS. 1 to 6, so as to cause synchronous rotation of the gear surfaces on the inner races 172 of the roller pairs at equal angles but opposite directions in setting the desired angles of the roller pairs. Specifically, control rod 179 for the yoke 171 will in establishing the desired angular setting of the roller pairs 115 and 115' simultaneously establish the rotational setting of the cam 185 to control the loading of the control rollers against the ball 125. When the angular setting of the control rollers is such that an infinite speed ratio is established, the rotational setting of the cam 185 will be such as to release the control rollers from engagement with the ball 125.

It is therefore to be understood that various modifications and changes may be made in the preferred and modified forms of invention as herein set forth and described without departing from the spirit and scope thereof as defined by the appended claims.

I claim:

1. In a variable drive transmission wherein a pair of independently rotatable input and output members are disposed in spaced facing relation to one another and a speed control mechanism therebetween to regulate the speed ratio between input and output members, said speed control mechanism comprising:

a single variable transmission element of generally spherical shape positioned between said input and output members, said transmission element being rotatable about a variable axis of rotation to impart the torque of said input member to said output member at a variable speed ratio, said input and output members being in the form of generally ring-like members having generally concave surfaces engageable with said transmission element on opposite sides of said transmission element, said output member having a bearing assembly provided with circumferentially spaced, rollable bearing elements between a pair of opposed races, one of said races defining one of said generally ring-like members including said concave surface and being journaled by said bearing elements with respect to the other of said races, internal confronting surfaces of said races having ramp members extending in a circumferential direction and angled inwardly toward said transmission element to cause the inward movement of said bearing elements along said ramp members whereby in response to increases in torque said bearing assembly means is operative to urge said one race against said transmission element and increase the pressure between said transmission element and said input and output members; and rotatable control roller means establishing surface engagement with said transmission element symmetrically about an imaginary radial line through the center of said transmission element which radial line bisects the angle formed between imaginary radial line extending from the center of said transmission element the points of engagement of said input and output members, said rotatable control roller means including means mounting said control roller means under predetermined compression to exert force against said transmission element in a direction causing said transmission element to bear against a limited surface portion of each of said input and output members, said rotatable control roller means being pivotal about said first imaginary radial line passing therethrough so as to establish an angle of surface engagement with said transmission element to vary the axis of rotation of said transmission element and thereby to vary the speed ratio of said input member to said output member through said transmission element.

2. In a variable speed drive transmission according to claim 1, each of said input and output members being in the form of a ring having an annular annular concave surface portion engageable with said transmission element through a limited surface of engagement in the general form of an ellipse.

3. In a variable speed drive transmission according to claim 2, the surface engagement of said rotatable control roller means with said transmission element being on the order of five times the surface of engagement of said input and output members with said ball.

4. In a variable speed drive transmission according to claim 3, a common housing for said rotatable control roller means and said input members, and a tractant material contained in housing.

5. In a variable transmission according to claim 4, said common housing including circulating means 6. In a variable speed drive transmission according to claim 1, including an output shaft, said output member including clutch means to cause slippage between said output member and said output shaft in response to resistance to turning by said output shaft.

7. In a variable speed drive transmission wherein a pair of independently rotatable input and output members are disposed in facing relation to one another to impart torque from a driving member to a member to be driven, and a speed control mechanism is interposed between said input and output members to regulate the speed ratio between said input and output members, said speed control mechanism comprising:

a single variable speed transmission element in the form of a single ball rotatable about a variable axis of rotation between said input and output members to impart torque from said input member to said output member at a ratio dependent upon the axis of rotation of said ball; and rotatable control means defined by a pair of rollers disposed in circumferentially spaced relation to one another and engageable with said ball symmetrically about an imaginary plane passing through the center of the ball which plane bisects the angle formed between imaginary radial lines extending from the loci of engagement of said input and output members to the center of the ball, each of said rollers defined by a pair of roller elements mounted for rotation on a common control shaft, said roller elements independently journaled with respect to said control shaft and having outer ball-engaging surface portions inclining inwardly toward one another, pivotal means for pivoting said control rollers in equal increments but in opposite directions to one another with respect to said imaginary plane passing therethrough so as to establish an angle of surface engagement with said ball to control its axis of rotation and thereby determine the speed and torque ratio imparted by said input member to said output member through said ball, said input and output members being in the form of generally ring-like members having generally concave surfaces engageable with said transmission element on opposite sides of said transmission element, said output member having a bearing assembly provided with circumferentially spaced, rollable bearing elements between a pair of opposed races, one of said races defining one of said generally ring-like members including said concave surface and being journaled by said bearing elements with respect to the other of said races, internal confronting surfaces of said races having ramp members extending in a circumferential direction to control the inward movement of said bearing elements along said ramp members whereby in response to increases in torque is operative to urge said one race against said transmission element and increase the pressure between said ball and said input and output members, the included angle formed between imaginary radial lines extending from the center of said ball through the points of engagement of said pair of rollers substantially corresponding to the angle of separation between the loci of engagement of said input and output members with said ball.

* * * * *